United States Patent [19]

Bowden, Jr. et al.

[11] 4,165,851

[45] Aug. 28, 1979

[54] ADJUSTABLY LOCKABLE BAR HANGER FOR CEILING BOXES AND THE LIKE

[75] Inventors: Wade R. Bowden, Jr., Northport; Walter C. Lewis, East Northport, both of N.Y.

[73] Assignee: Slater Electric Inc., Glen Cove, N.Y.

[21] Appl. No.: 837,620

[22] Filed: Sep. 28, 1977

[51] Int. Cl.² .................................................. F16L 5/00
[52] U.S. Cl. .................................... 248/57; 248/217.3; 248/DIG. 6; 403/107
[58] Field of Search ................ 248/57, 217.2, DIG. 6; 403/107; 211/105.3, 123

[56] References Cited

U.S. PATENT DOCUMENTS

| | | | |
|---|---|---|---|
| 1,552,204 | 9/1925 | Bowers | 248/DIG. 6 |
| 1,675,921 | 7/1928 | Buchanan | 248/DIG. 6 |
| 1,982,957 | 12/1934 | Knell | 248/DIG. 6 |
| 2,312,278 | 2/1943 | Zaiger | 403/107 |
| 2,528,418 | 10/1950 | Buckels | 248/57 |
| 2,732,160 | 1/1956 | McKinley | 248/DIG. 6 |
| 2,809,002 | 10/1957 | Rudolph | 248/DIG. 6 |
| 2,917,263 | 12/1959 | Appleton et al. | 248/DIG. 6 |
| 2,962,252 | 11/1960 | Frank | 248/DIG. 6 |
| 2,963,253 | 12/1960 | Maier et al. | 248/DIG. 6 |
| 3,104,087 | 9/1963 | Budnick et al. | 248/217.2 X |
| 3,163,386 | 12/1964 | Collins | 248/DIG. 6 |
| 3,214,126 | 12/1965 | Ross et al. | 248/DIG. 6 |
| 3,428,284 | 2/1969 | Trachtenberg et al. | 248/DIG. 6 |
| 3,518,421 | 6/1970 | Cogdill | 248/57 |
| 4,047,353 | 9/1977 | Aarons | 403/107 X |

Primary Examiner—William H. Schultz
Attorney, Agent, or Firm—Morgan, Finnegan, Pine, Foley & Lee

[57] ABSTRACT

An adjustably lockable bar hanger support for mounting a ceiling box or the like to a floor/ceiling joist includes a male and a female support member each being generally L-shaped and each having a generally elongate leg adapted for slidable telescoping engagement with the elongate leg of the other member and a relatively short leg adapted for attachment to the joist. As preferably embodied, the male member elongate leg is slidable within the female member elongate leg, and the female member is formed with a detent tab of its elongate leg, which is adapted to be deflected into a receiving aperture formed in the elongate leg of the male member for locking the male and female members in assembled relationship when the tab and aperture are aligned. Advantageously, at least two receiving apertures are formed in the male member elongate leg at locations which, when positioned adjacent the detent tab, correspond to predetermined inter-joist spacings. Also advantageously, and as preferably embodied, the apertures are sufficiently long to enable small adjustments to the length of the assembled bar hanger for accommodating irregularities in or variations from the nominal inter-joist spacing when mounting the hanger support to the joists.

10 Claims, 9 Drawing Figures

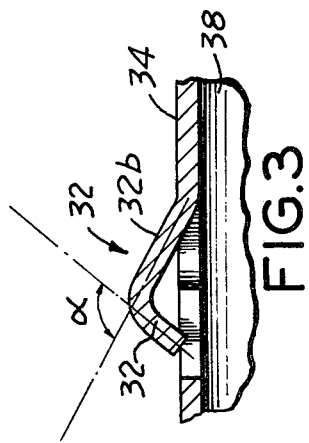
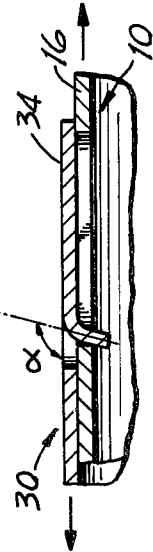
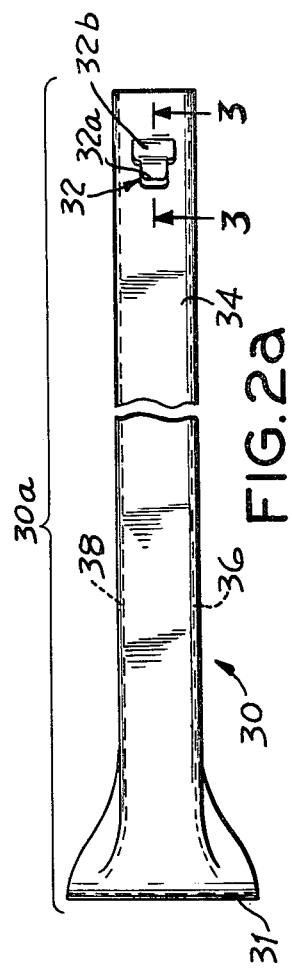
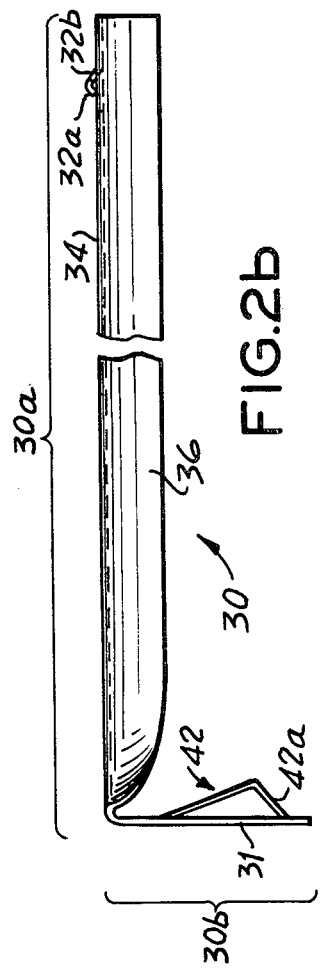
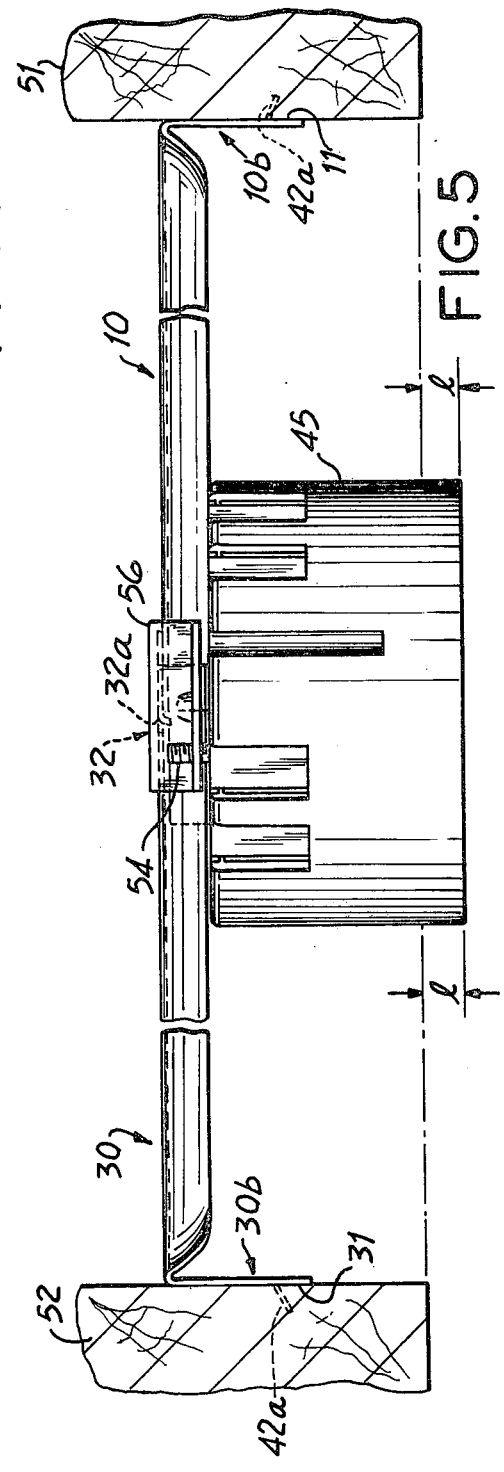

ADJUSTABLY LOCKABLE BAR HANGER FOR CEILING BOXES AND THE LIKE

BACKGROUND AND OBJECT OF THE INVENTION

The present invention relates generally to support devices for installing electrical outlet boxes or the like, and, more particularly, to variable length support hangers for mounting ceiling boxes between a pair of ceiling joists. However, it will be understood that although the present invention is described with respect to ceiling boxes suspended from ceiling/floor joists, it will be equally applicable to other outlet boxes which are to be mounted at a point between two adjacent support studs or the like.

In the installation of lighting fixtures in or to ceilings, it has become standard practice to mount the electrical distribution portion of the fixture within a ceiling box to which at least a portion of the fixture is also usually fastened. The ceiling box is generally supported over an opening in the ceiling (usually constructed of the same plasterboard or "sheetrock" as the interior walls) by a hanger bar attached to and suspended from the two ceiling/floor joists adjacent the opening, with the ceiling box assembly mounted to the joists before the ceiling is installed.

In general, the hanger bar is usually made up of a pair of slidably telescoping support members which are adapted to be secured to the joists by nails or the like. When the electrician sets about mounting the ceiling box to the joists, he can estimate or measure the inter-joist spacing and tighten the ceiling box on the bar hanger when the ends of the hanger define a distance equal to the inter-joist spacing so that relative movement between two members are prevented as he attempts to attach the bar hanger to the sides of the joists. However, if his estimate is not precisely correct, or if there are irregularities in the inter-joist spacings at the point of installation, he must loosen the ceiling box to adjust the length of the hanger, or otherwise try to manipulate the hanger members to arrive at the precise joist spacing to complete installation.

Alternatively, he can initially leave the ceiling box loose on the hanger and try to adjust the length of the hanger while attempting to attach each end of the hanger to the joists. However, with such loose assembly, the bar hangers will be relatively awkward to handle and could become completely dis-assembled while the electrician is attempting installation. In either event, mounting the ceiling box to the joists can be a time-consuming, inconvenient and possibly dangerous operation.

Therefore, it is an object of the present invention to provide a new and improved mounting assembly for electrical ceiling boxes and the like. It is another object of the present invention to provide a new and improved support hanger for ceiling boxes and the like, which is capable of generally locking the relative position of the hanger members prior to installation.

It is also an object of the present invention to provide a new and improved support hanger for ceiling boxes and the like, wherein the distance between the joist-mounting portions of the support hanger can be set and locked at desired lengths yet can be adjusted by small amounts to accommodate irregularities in the nominal inter-joist spacing.

It is a further object of the present invention to provide a new and improved hanger for ceiling boxes and the like wherein the distance between the joist-mounting portions of the support hanger can be adjustably locked at more than one predetermined length to accommodate different nominal joist spacings.

It is another object of the present invention to provide a new and improved support hanger for mounting ceiling boxes and the like to ceiling joists, which prevents separation of the support hanger members when a substantially heavy load is applied to the ceiling box or the fixture mounted thereto so that the support hanger will not fail under such loading, particularly if subjected to a relatively high temperature.

It is a further object of the present invention to provide a new and improved support hanger for mounting ceiling boxes and the like to ceiling joists, wherein the bar hanger can be adjustably lockably assembled so that the locking means tends to become further engaged when an attempt is made to pull the hanger apart.

It is yet another object of the present invention to provide a new and improved support hanger for mounting ceiling boxes and the like to ceiling joists, wherein the bar hanger can be adjustably lockably assembled and the ceiling box can remain loosely attached thereto during the entire installation procedure.

Objects and advantages of the invention are set forth in part herein and in part will be apparent herefrom, or may be learned by practice with the invention, the same being realized and attained by means of the structures, instrumentalities and combinations defined in the appended claims. Accordingly, the present invention resides in the novel parts, structures, arrangements, combinations and improvements herein shown and described.

SUMMARY OF THE INVENTION

Briefly described, the adjustable bar hanger according to the present invention comprises a female member and a male member each adapted for attachment to a joist or the like and each having a relatively elongate leg member adapted for slidable telescoping engagement with the elongate leg of the other member, the elongate leg of the male member being slidable within the elongate leg of the female member, and the elongate leg of one of the male or female members being formed with detent means adapted to be deflected into engagement with receiving means formed in the elongate leg of the other member for locking the male and female members in assembled relationship. In addition, the receiving means is adapted to enable adjustment of the length of the assembled support hanger, while separation of the male and female members is prevented by the detent and receiving means.

According to a preferred embodiment of the invention, the elongate legs of the male and female members have generally U-shaped channel-like cross-sections, formed by a base section from which depend two flange portions that are advantageously oriented angularly towards each other. In addition, the detent means comprise a tab formed on the base section of the female member and adapted to be deflected into the channel formed in the female member elongate leg and the receiving means comprise one or more rectangular openings formed in the base section of the male member elongate leg. As preferably embodied, the detent tab has an L-shaped cross-section and is formed inwardly from the free end of the female member elongate leg, in the base portion thereof, with one leg attached to the base portion and extending towards the free end of the female member elongate leg. Advantageously, the tab is formed with an obtuse angle between its attached leg and its free leg so that when the free leg is deflected into the channel in the male member elongate leg, the free leg of the tab extends slightly angularly towards the free end of the female member elongate leg.

Also as preferably embodied, the male and female members are formed with generally flat mounting legs which each extend perpendicular to their corresponding elongate legs and include means for initially mounting the hanger support to the joists for facilitating installation.

It will be apparent from the foregoing brief description that the objects of the invention specifically enumerated herein are accomplished by the invention as here disclosed. Thus, it has been found that a ceiling box support hanger can be constructed in accordance with the present invention, which can be generally locked in assembled condition before installation, for easy mounting to ceiling/floor joists.

It has further been found that by providing detent means on one of the support members and receiving means on the other support member, the support hanger can be generally fixedly assembled for predetermined joist spacings.

It has further been found that by providing detent means in the form of a deflectable tab formed on the female member elongate leg and receiving means in the form of one or more rectangular openings formed in the male member elongate leg, the hanger support can be lockably assembled for generally fixing the distance between the mounting legs, but is capable of small adjustments in the overall length of the assembled support hanger to accommodate variations in the inter-joist spacing without separating the support members and without repeatedly loosening and tightening the box. Moreover, by providing more than one receiving opening, the hanger support can be essentially universally adapted for mounting to joists spaced at different, but conventional inter-joist spacings, such as at 16 and 24 inches. Also, by providing a generally L-shaped detent tab adapted to be deflected into the channel in the female member elongate leg, the free leg of the tab can extend well into the receiving openings to ensure lockable engagement therebetween.

In addition, by providing an L-shaped detent tab formed at an obtuse angle to extend into the channel in the female member elongate leg, angularly towards the free end thereof, it will be found that the edge of the receiving aperture into which the tab is deflected tends to wedge further into locking engagement by the tab if an attempt is made to pull male and female members apart.

Furthermore, it will be found that each of the male and female members can be easily fabricated by conventional techniques from a single piece of sheet metal or the like and can similarly be formed with means on the mounting leg for initially mounting the support hanger to the joists.

It will be understood that the foregoing general description as well as the following detailed description are exemplary and explanatory of the invention but are not restrictive thereof. Thus, the accompanying drawings, referred to herein and constituting a part hereof, illustrate a preferred emdodiment of the invention and, together with the description, serve to explain the principles and advantages of the invention.

BRIEF DESCRIPTION OF THE DRAWINGS

FIG. 1b is a side elevation of the structure shown in FIG. 1a.

FIG. 2a is a plan view of the female member of a support hanger constructed in accordance with the present invention.

FIG. 2b is a side elevation of the structure shown in FIG. 2a.

FIG. 3 is a sectional view taken along section 3—3 of FIG. 2a.

FIG. 4 is a sectional view, similar to FIG. 3, of an assembled support hanger combining the members shown in FIGS. 1 and 2.

FIG. 5 is a side view of the structures shown in FIGS. 1-3 assembled together and secured to a ceiling box.

DETAILED DESCRIPTION OF A PREFERRED EMBODIMENT

Figure 1A:
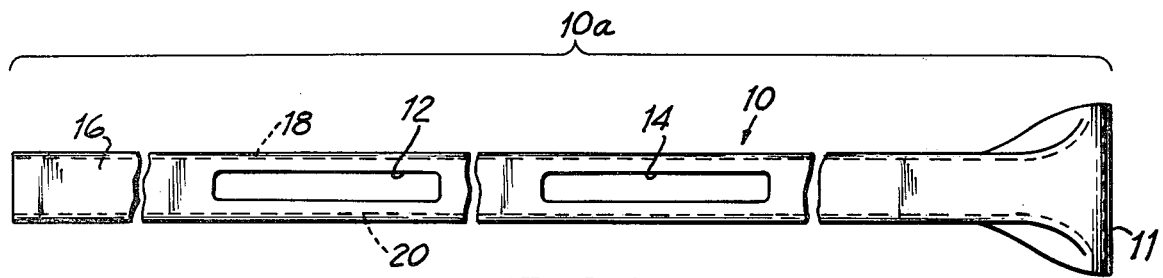
FIG. 1a is a plan view of the male member of a support hanger constructed in accordance with the present invention.

Referring now generally to the accompanying drawings, wherein like reference characters refer to like parts throughout the various view, there are illustrated various view of the component parts of a preferred embodiment of the hanger support according to the present invention, which is adapted for installing ceiling boxes and the like.

Figure 1B:
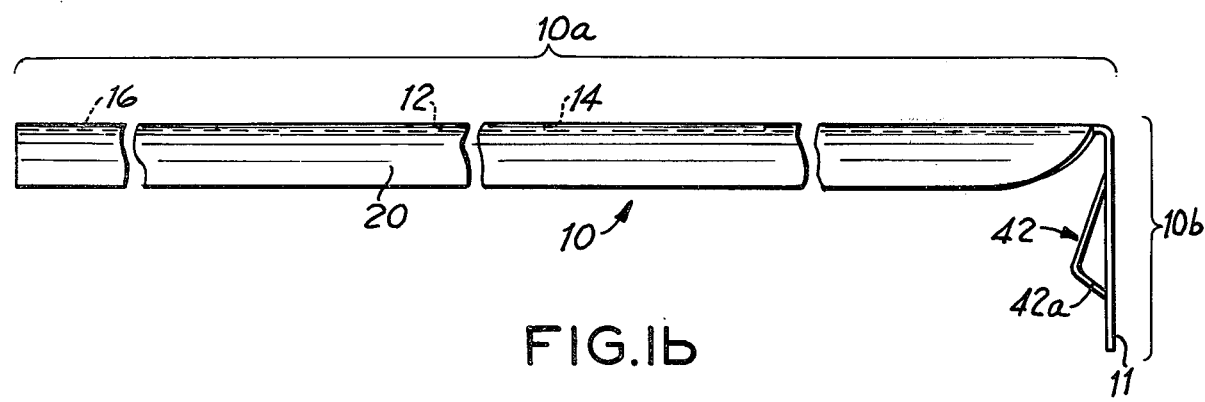
Figure 1C:
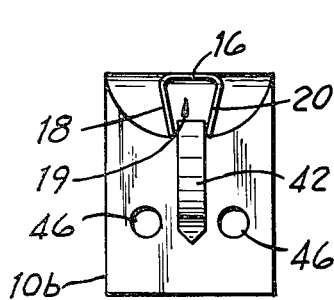
FIG. 1c is a front elevation of the structure shown in FIG. 1a, looking in a direction from left to right.

Turning specifically to FIGS. 1a-1c, there are shown various views of a preferred embodiment of the male support member, indicated generally at 10, according to the present invention. Male member 10 is generally L-shaped and includes a relatively elongate leg 10a (described more fully hereinafter) and a relatively short mounting leg 10b adapted to be attached against a surface of a ceiling/floor joist (indicated at 51 in FIG. 5). Advantageously, elongate leg 10a is formed as a generally channel-like structure with base portion 16 and two flange portions, 18 and 20, depending therefrom and, preferably, oriented angularly towards each other to define channel 19, for telescoping action with the female member, as will become more evident from the description below.

Figure 2C:
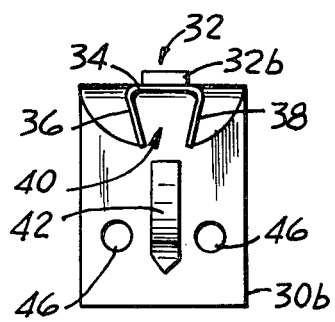
FIG. 2c is a front elevation of the structure shown in FIG. 2a, looking in the direction from right to left.

Referring now to FIGS. 2a-2c, there is illustrated a preferred embodiment of the female support member, indicated generally at 30, according to the present invention. Advantageously, female member 30 is also a generally L-shaped structure which includes elongate leg 30a and relatively shorter leg 30b adapted to be attached against the surface of another ceiling/floor joist (indicated at 52 in FIG. 5). Also advantageously, elongate leg 30a is a channel-like structure formed by base section 34 with flange sections 36 and 38 depending therefrom and, preferably, oriented angularly towards each other to form channel 40 proportioned to permit insertion of leg 10a of male support 10 thereinto to enable slidably telescoping action of members 10 and 30.

According to one aspect of the invention, the support hanger is provided with means for locking male member 10 and female member 30 in assembled relationship generally to prevent separation thereof. To this end, female member 30 is formed with detent means in the form of tab 32, adapted to be deflected into channel 40, formed in its elongate leg 30a, and male member 10 is formed with receiving means in the form of one or more apertures (indicated at 12 and 14) adapted to permit insertion of the free end of tab 32 thereinto when deflected into channel 40.

Referring more particularly to FIG. 3, tab 32 advantageously has a generally L-shaped cross-section, with the free end of its free leg portion 32a adapted to extend well beyond the inside surface of base section 34 when its attached leg portion 32b is deflected so as to be generally flush with base section 34. In this way, leg 32a will extend sufficiently into channel 40 to ensure that it will reside within the selected aperture (12 or 14) formed in leg 10a for preventing separation of members 10 and 30. As preferably embodied, apertures 12 and 14 are positioned so that when tab 32 is inserted into one of them, the distance between mounting legs 10b and 30b (as defined by mounting surface 11 on leg 10b of male member 10 and mounting surface 31 on leg 30b of female member 30) of the assembled support hanger is equal to a predetermined length. Advantageously, such predetermined length is the nominal spacing between joists (16" or 24" in most current conventional construction projects) to which the ceiling box is to be mounted.

Accordingly, for assembly, the free end of leg 10a of male member 10 is inserted into channel 40 defined in leg 30a of female member 30 until tab 32 is positioned opposite the appropriate opening (12 or 14) in leg 30a for providing the desired distance between the joist-abutting surfaces 11 and 31. Thereafter, tab 32 is deflected into the opening, as by tapping with a hammer or squeezing it with pliers which bear against the free edges of the flange portions. Furthermore, with the male and female members locked together the ceiling box (indicated at 45 in FIG. 4) can be loosely secured to the assembled hanger support 1 so as to be freely slidably thereon. Thus, box 45 can be located at any point on hanger 1 for positioning at the anticipated opening in the ceiling, without risk of hanger support 1 becoming disassembled.

As preferably embodied, the receiving means in male member 10 are adapted to enable relatively small adjustments of the distance defined between surfaces 11 and 31. It will be understood that such adjustments may be necessary for accommodating any irregularity in or variation from the nominal inter-joist spacing at the location for installation of box 45. To this end, each opening formed in male member 10 (i.e., openings 12 and 14) is proportioned to permit insertion of tab 32 thereinto, yet permit sufficient relative sliding of members 10 and 30 for enabling such adjustments to be effected while still preventing separation of the male and female members. It has been found that by forming openings 12 and 14 to about 1κ inches in length, sufficient adjustment capability is provided for accommodating typical variations from nominal joist spacings encountered in conventional 16-inch and 24-inch joist spacings.

Advantageously, and as here preferably embodied, L-shaped tab 32 is formed at a slightly obtuse angle (i.e., angle α in FIG. 3) for wedging against the edge of the aperture into which it is inserted to ensure locking even when a heavy weight is applied to the support hanger. In this context, it has been found particularly useful that angle α equal about 95° so that if an attempt is made to separate members 10 and 30 when tab 32 has been deflected into one of openings 12 or 14 (as illustrated in FIG. 4), tab 32 engages the edge of the opening so as to urge base portion 16 towards base portion 34. That is, the edge of the opening is further wedged into locking engagement with tab 32, even if leg 32b is not completely flush with base portion 34. In addition, tab 32 is advantageously located at a point slightly away from the free end of leg 30a so that the male member elongate leg 10a is engaged by flanges 36 and 38 on both sides of tab 32 for further ensuring that the tab will not be removed from the opening (12 or 14) if a heavy load is applied to the assembled hanger. Moreover, when tab 32 is deflected into aperture 12 or 14, leg 32b will become generally flush with base portion 34, so that ceiling box 45 will be substantially freely slidable along inter-connected legs 10a and 30a.

Also advantageously, tab 32 may be formed in a generally T-shape in plan view, with leg 32b being wider than leg 32a. In this way, the tab is reinforced against bending of leg 32b during deflection or if an attempt is made to pull the assembled hanger. In addition, both flange portions (i.e., flanges 36 and 38 on female member 30 and flanges 18 and 20 on male member 10) are inclined towards each other to form acute angles with their base portions (i.e., portions 34 and 16, respectively), forming generally triangular channels (i.e., channels 40 and 19, respectively) for enabling leg 10a to be retained within channel 40 while providing a simple structure to fabricate. Furthermore, the free edges of flange portions 18 and 20 are adapted to extend slightly beyond the free edges of flange portions 36 and 38 so that when the ceiling box is tightened onto the assembled hanger support, base portion 16 of male member 10 will be wedged against base portion 34 of female member 30 for substantially fixing the locations of members 10 and 30 relative to each other, as well as fixing the location of the box, as can be seen in FIG. 5.

Accordingly, for installation, the support hanger is assembled as described above, with tab 32 deflected into the appropriate aperture (12 or 14) corresponding to the nominal joist spacing and with ceiling box 45 loosely secured to the hanger. The hanger is thence positioned at the desired location between joists and its length is adjusted so that surfaces 11 and 31 are in contact with the joists to which they will be attached. Thereafter, the mounting legs may be secured to the joists in any conventional manner such as by nailing them to the joists.

As preferably embodied, however, the mounting leg portions of the male and female members (i.e., legs 10b and 30b, respectively) are formed with deflectable retaining tabs 42 adapted to be hammered into the joists for initially mounting the hanger support with box 45 supported thereon to the joists. As here embodied, retaining tabs 42 are die stamped directly out of the mounting legs and formed in a generally L-shaped configuration. As preferably embodied, tabs 42 are located outwardly of the mounting legs on the sides thereof opposite the mounting surface on the leg. Thus, as shown in FIG. 5, the assembled support hanger, with box 45 attached thereto, can be initially mounted to joists 51 and 52 by hammering one of tabs 42 into the joist, to "tack" the corresponding mounting leg thereto. The other mounting leg can then be positioned with its mounting surface (11 or 31) adjacent the other joist by pulling it in the direction away from the first "tacked" mounting leg and itself likewise "tacked" to its joist by hammering the tab 42 formed thereon into the joist. Thereafter, the assembled bar hanger can be permanently mounted to the joists by hammering nails through apertures 46 formed in the mounting legs. Finally, box 45 can be positioned on the now-installed bar hanger at its anticipated location in the ceiling and tightened thereon by threading screws (one of which is shown and indicated by reference number 54) which extend through the back wall of box 45 into threaded apertures in suitably formed bracket 56.

In order to ensure that the first "tacked" mounting leg is not pulled off the joist into which its tab 42 had been hammered when the other mounting leg is positioned to abut the other joist, tab 42 is advantageously formed with a slightly obtuse angle between its two leg members. Thus, when hammered into the joist surface, leg 42a will be oriented at a non-right angle with respect to that surface to further resist removal while the position of the other mounting leg is being manipulated.

It will be understood by those skilled in the art that the hanger support is preferably mounted to joists 51 and 52 so that the distance (indicated at $a$ in FIG. 5) between the plane defined by the front face of box 45 and the plane defined by the bottom edges of the joists is equal to about the thickness of the wallboard, or whatever other material is used to form the ceiling so that the front face of box 45 will be flush with the bottom surface of the ceiling, or, advantageously, slightly above such surface so that it will not extend beyond the surface when the lighting fixture is installed.

To this end, the mounting legs can be formed with locating feet (not shown) which extend perpendicular thereto and are adapted to abut the bottom edge of the joist for locating the front face of box 45 in accordance with the description above. In addition, the locating feet (also not shown) can be formed with retaining points extending perpendicular thereto (i.e., parallel to the mounting legs) to initially "tack" the hanger to the joists instead of retaining tabs 42. It will be understood that since the retaining points are perpendicular to legs 10a and 30a, any slidable adjusting of legs 10a and 30a during the initial mounting operation will not cause the first "tacked" end to become loosened.

Furthermore, although it is preferred that tab 32 is generally T-shaped in plan view and offers the advantages described hereinbefore, it will be understood that tab 32 can simply be straight in plan view, and bent into the L-shaped or the slightly obtuse L-shaped cross-sectional configuration described above.

Accordingly, it will be readily appreciated by those skilled in the art that the invention in its broader aspects is not limited to the specific embodiments herein shown and described. Rather, variations may be made therefrom within the scope of the accompanying claims without departing from the principles of the invention and without sacrificing its advantages.

What is claimed is:

1. An improved adjustable bar hanger for supporting an electrical outlet box, ceiling box and the like from a pair of structural joists, having a generally elongate male bar member telescopically slidable within a channel formed in a generally elongate female bar member, opposite ends of the male and female members each adapted to be attached to a joist for suspending the box from a pair of joists, wherein the improvement comprises:
   a detent tab formed on the elongate portion of the female member, said detent tab adapted to be deflected into the channel in the female member and having a generally L-shaped cross-sectional configuration with a first leg attached to the female member and a second leg adapted to protrude into the channel in the female member when said detent tab is deflected; and
   at least one slot-like opening formed in the elongate portion of the male member and located thereon for alignment with said detent tab to permit protrusion of said second leg thereinto when the male and female members are extended to a predetermined length, said slot-like opening being proportioned to permit some relative slidable movement of the male and female members when said second leg protrudes thereinto, such that when said bar hanger is to be mounted to a pair of structural joists spaced by about said predetermined length, the male and female members are extended to said predetermined length and said detent tab is deflected to cause said second leg to protrude into a said slot-like opening for generally locking the male and female members against substantial relative movement yet permitting the length of said bar hanger to be adjusted within a range defined by the length of said slot-like opening.

2. A bar hanger according to claim 1, wherein the telescoping elongate portions of the male and female members are generally channel-like members of essentially similar cross-sectional configuration, each having an elongate base section and two elongate flange sections depending from each side edge of said base section.

3. A bar hanger according to claim 2, wherein said detent tab is formed on the base section of the female member and said slot-like opening is formed in the base portion of the male member.

4. A bar hanger according to claim 3, wherein the two flange sections of the male and of the female members form acute angles with respect to their corresponding base portions, such that said two flange sections on each member are inclined towards each other to form generally triangularly shaped channels.

5. A bar hanger according to claim 4, wherein the free edges of the flange sections of the male member are proportioned to extend beyond the free edges of the flange sections of the female member when the male and female members are slidably interlocked.

6. A bar hanger according to claim 1, wherein the elongate portion of the male member is formed with two slot-like openings, said slot-like openings being located thereon such that when said tab portion protrudes into a different one, the male and female members are extended generally to different predetermined lengths.

7. A bar hanger according to claim 6, wherein each said slot-like opening is about 1½ inches long such that when said tab portion protrudes into either said slot-like opening, the length of said bar hanger can be varied by about 1½ inches.

8. A bar hanger according to claim 1, wherein said detent tab is located at least a relatively short distance from the free end of the female member and the portion of said detent tab attaching said tab portion to the female member extends generally towards said free end thereof.

9. A bar hanger according to claim 8, wherein the portions of said L-shaped tab form an angle of about 95°, such that an edge of said slot-like opening will be further wedged into locking engagement if a force tending to extend the male and female members is applied thereto.

10. A bar hanger according to claim 7, wherein said slot-like openings are located on the male member such that when said detent tab is deflected into one of said slot-like openings the length of said bar hanger is about 16 inches and when said detent tab is deflected into the other the length of said bar hanger is about 24 inches.

* * * * *

UNITED STATES PATENT AND TRADEMARK OFFICE
CERTIFICATE OF CORRECTION

PATENT NO. : 4,165,851

DATED : August 28, 1979

INVENTOR(S) : Wade R. Bowden, Jr.; Walter C. Lewis

It is certified that error appears in the above-identified patent and that said Letters Patent are hereby corrected as shown below:

Abstract, line 10, "of" should be --on--;
Column 3, line 66, "emdodiment" should be --embodiment--;
Column 5, line 56, "1k" should be --1 1/2--.

Signed and Sealed this

Twelfth Day of February 1980

[SEAL]

Attest:

SIDNEY A. DIAMOND

Attesting Officer

Commissioner of Patents and Trademarks